July 7, 1964
E. C. RICE, SR
3,139,648
FISH CUTTING AND CLEANING MACHINE
Filed June 29, 1962
4 Sheets-Sheet 1
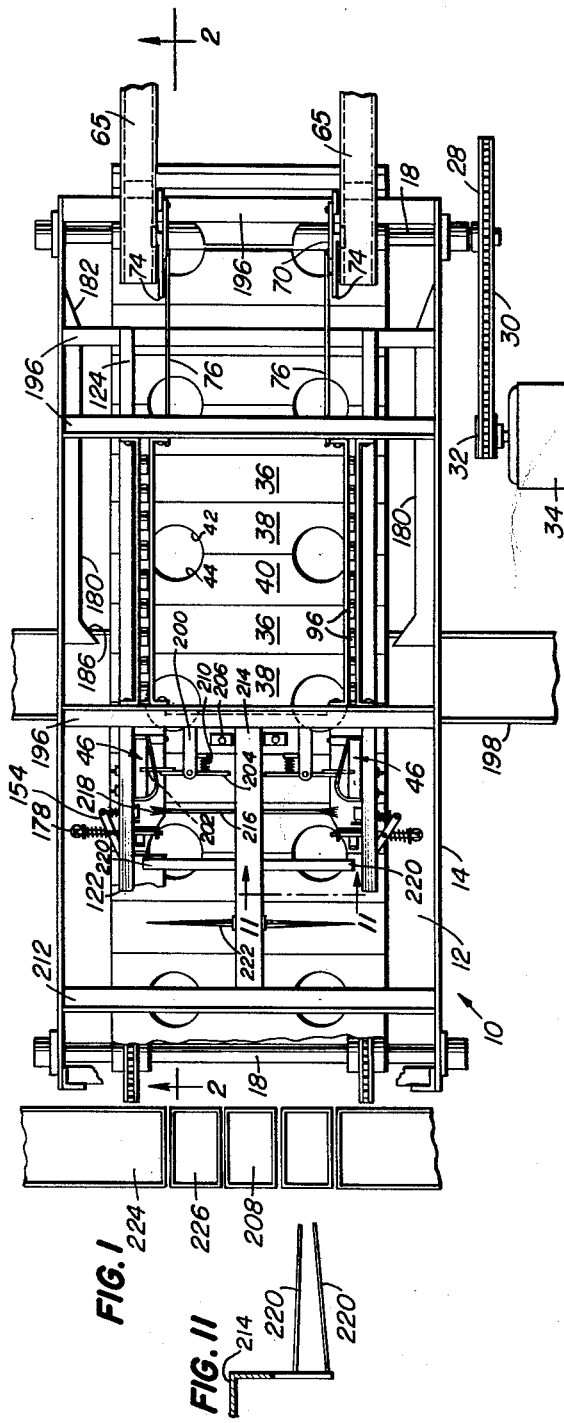
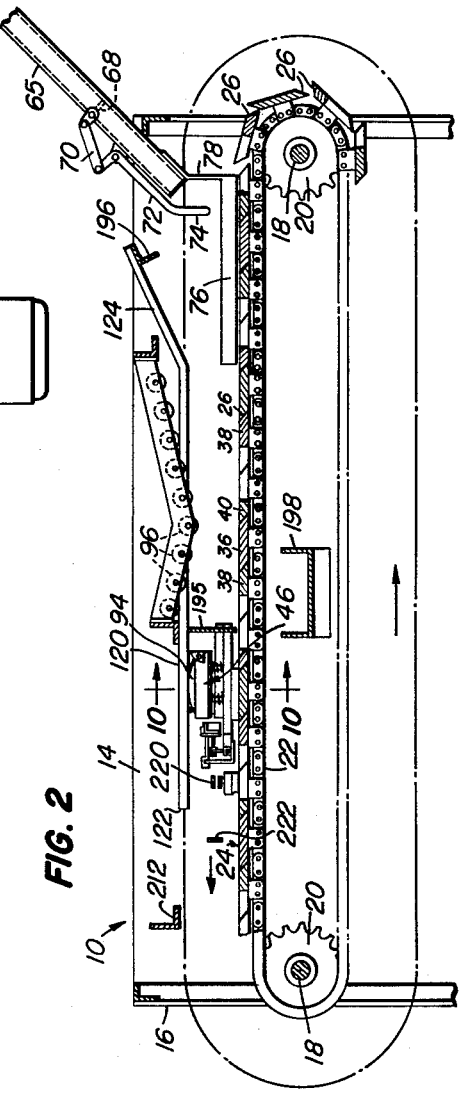
INVENTOR
Emory C. Rice, Sr.
BY Gustav Miller
ATTORNEY

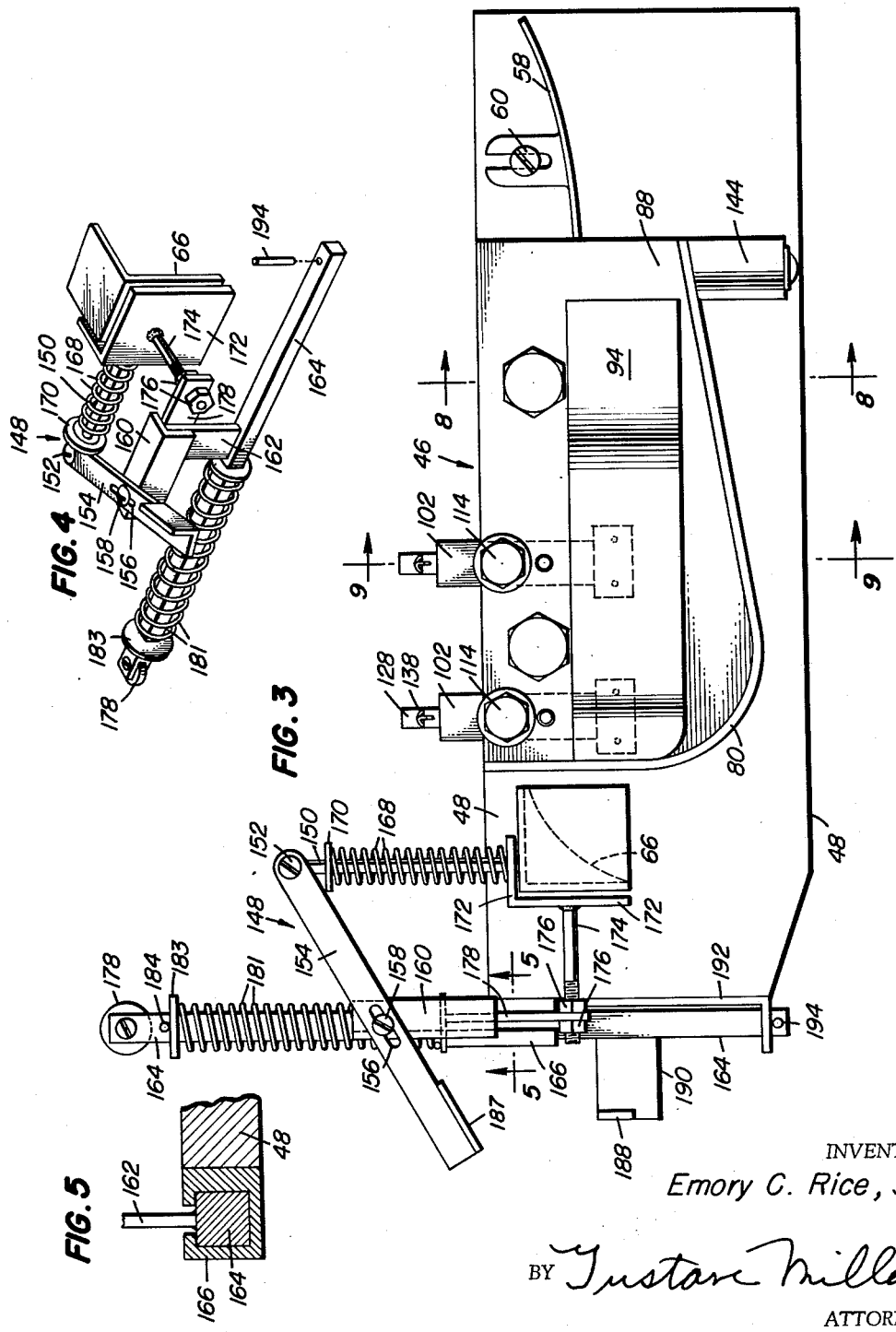

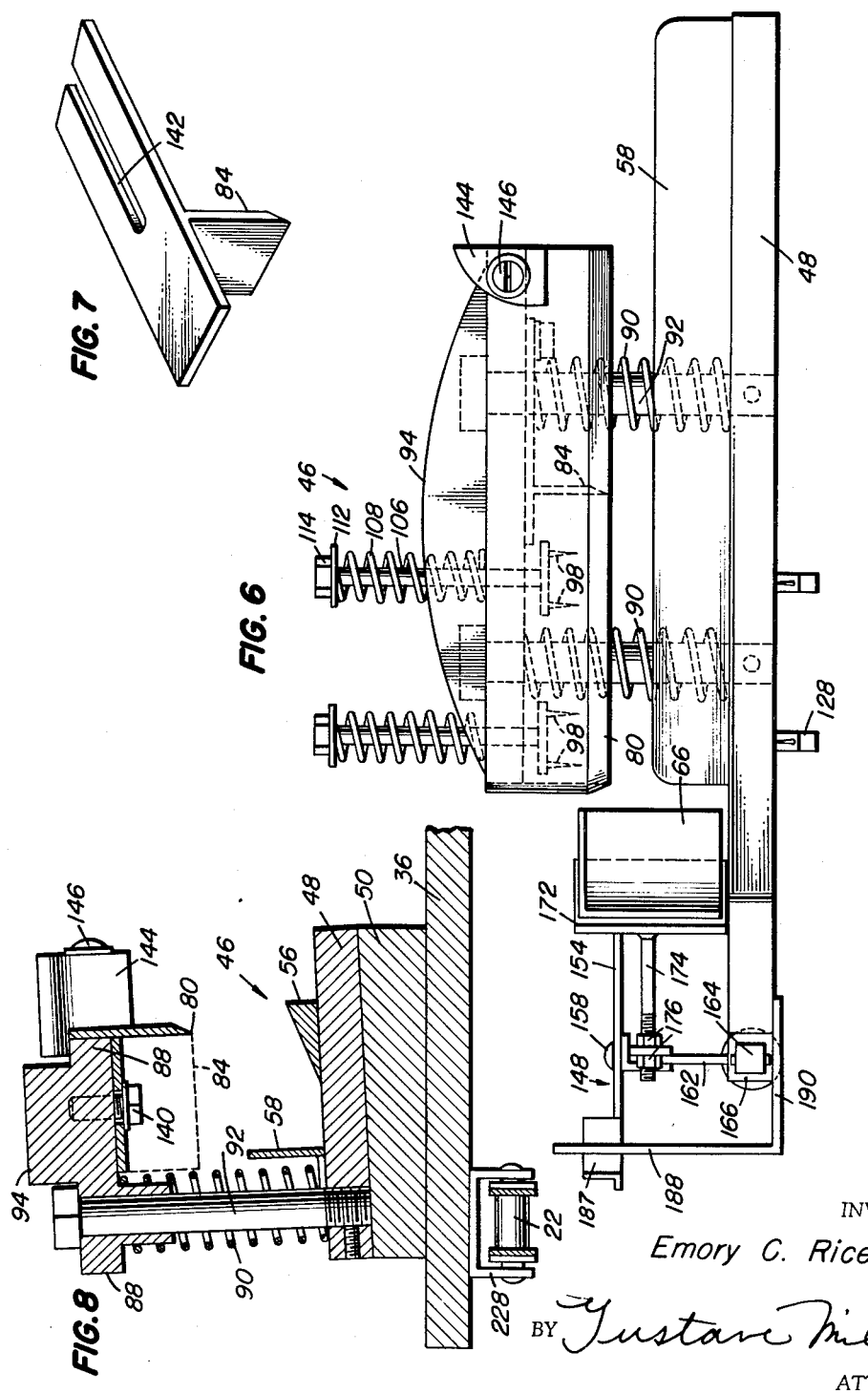

July 7, 1964 E. C. RICE, SR 3,139,648
FISH CUTTING AND CLEANING MACHINE
Filed June 29, 1962 4 Sheets-Sheet 4
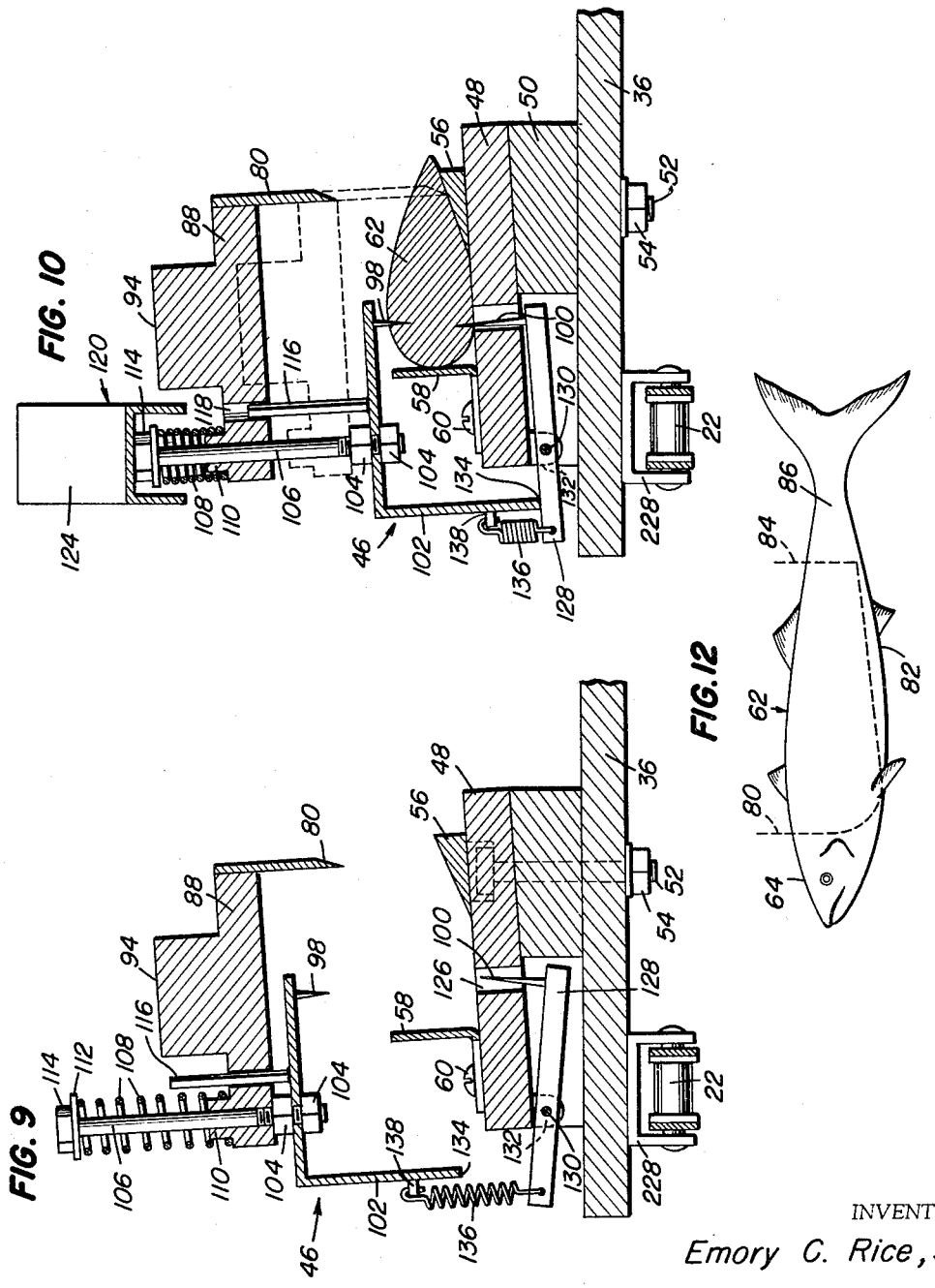
INVENTOR
Emory C. Rice, Sr.
BY Gustave Miller
ATTORNEY United States Patent Office 3,139,648
Patented July 7, 1964

3,139,648
FISH CUTTING AND CLEANING MACHINE
Emory C. Rice, Sr., Box 86, Reedville, Va.
Filed June 29, 1962, Ser. No. 206,450
16 Claims. (Cl. 17—3)

This invention relates to a fish cutting and cleaning machine and has for an object to provide an improved machine which will automatically cut a fish, remove its roe, separate and clean the debris from the fish and deposit the separated parts of the fish in separate locations for further convenient processing.

Still a further object of this invention is to provide a fish cutting and cleaning machine which will automatically feed a fish thereto for cutting and cleaning operations in the proper sequence and thereafter deposit the separated elements of the fish in separate stations for further processing.

Still a further object of this invention is to provide an improved fish cutting and cleaning machine provided with means for sequentially feeding fish to a plurality of fish holding units in spaced relation on an endless conveyer, including a plurality of sequential actuating means for actuating the means on the unit to hold the fish, then cutting the head, tail and longitudinal belly edge portion to open the fish in a simultaneous operation, then removing the cut debris from the unit, then removing the fish roe from the cut open fish, then removing blood and breaking down the backbone tissue, then cutting out and removing the fish backbone, then actuating the fish holder to release the fish, and then removing the fish from the holder.

Still a further object of this invention is to provide a fish cutting and cleaning machine provided with a number of improved actuating means for the sequential operations as the fish pass through the machine.

With the above and related objects in view, this invention consists in the details of construction and combination of parts, as will be more fully understood from the following description, when read in conjunction with the accompanying drawings in which:

FIG. 1 is a top elevational view of the fish cleaning and cutting machine partly broken away for clarity of illustration, and with only two of the multiplicity of fish cutting units illustrated thereon.

FIG. 2 is a sectional view on line 2—2 of FIG. 1.

FIG. 3 is a top plan view of one individual fish cutting and cleaning unit on an enlarged scale.

FIG. 4 is an enlarged perspective view of the fish head positioning and removing details.

FIG. 5 is an enlarged sectional view on line 5—5 of FIG. 3.

FIG. 6 is an elevational view of the fish cleaning and cutting unit shown in FIG. 3.

FIG. 7 is an enlarged perspective view of the fish-tail cutting knife.

FIG. 8 is a sectional view on line 8—8 of FIG. 3.

FIG. 9 is a sectional view on line 9—9 of FIG. 3.

FIG. 10 is a sectional view of the same details as in FIG. 9 but with the cutting unit advanced into fish holding and cutting position.

FIG. 11 is an enlarged sectional view on line 11—11 of FIG. 1.

FIG. 12 is a detailed view showing the position of the cutting edges relative to the fish.

There is shown at 10 the fish cutting and cleaning machine of this invention. This machine 10 includes a framework consisting of longitudinal horizontal side plates 12 and vertical side plates 14 secured to and supported on vertical legs 16. Journaled through the vertical side plates 14 at opposite ends thereof are axles 18 to each of which are fixed a pair of sprocket wheels 20 and around which travel the sprocket chains 22 providing an endless conveyer along with transverse plates 24 providing a traveling floor for the conveyer means.

As apparent from FIGS. 1 and 2, the transverse plates 24 are provided with oblique angle transverse side edges 26 on their front and rear edges as viewed at the top of the conveyer floor, such oblique angle edges permitting the conveyer floor plates 24 to readily separate as they go around the sprocket wheels 20 at each end and yet form a tight fitting floor when traveling forwardly in the upper portion of the conveyer means.

One of the axles 18 and its sprocket wheels 20 has at its end a driven wheel 28 over which passes a power belt 30 which in turn passes over a power wheel 32 of an electric motor 34 for controllably operating the conveyer floor plates 24 in the proper direction and at the desired speed, it being noted that the power wheels 32 and 28 provide a suitable speed reduction. Obviously, while the power belt 30 here is shown as a sprocket chain and the power wheels as sprocket wheels, conventional pulleys and belts or other similar power transmission means such as a gear train may likewise be utilized.

As will be apparent, particularly from FIG. 1, the conveyer floor plates 24 consists of a plurality of units, each being one solid transverse floor plate 36 and two apertured floor plates 38 and 40, one on each side of the floor plate 36. The floor plates 38 and 40 are each provided with a pair of complementary apertures 42 and 44 adjacent each end thereof providing a passageway through these plates 38 and 40. The floor plate 36 provides means for supporting and carrying a fish cutting and cleaning unit 46 adjacent each end thereof, the unit 46 being shown in more detail in FIG. 3 and the detail section of views in FIGS. 4 to 11, inclusive. For clarity of illustration, the unit 46 shown in FIG. 3 is provided with a similar unit which is a mirror image thereof at the opposite end of the floor plate 36 and all the associated mechanism for operating the one unit at 46 at one end of the floor plate, hereinafter described, is similarly duplicated on the other end and other side of the conveyer floor. Furthermore, for clarity of illustration, only one pair of units 46 is shown at opposite ends of one floor plate 36 in FIG. 1, the remaining floor plates 36 having such units omitted from the illustration for clarity and to avoid confusion in illustration but the machine in operation will have a pair of similar fish cutting and cleaning units 46 at opposite ends of each third floor plate 24, that is, on each solid floor plate 36.

The cutting unit is next described. The cutting unit 46 consists of a fish supporting and cutting floor 48 mounted on an angle on an angular block 50 and secured by counter sunk bolts 52 and nuts 54 at each end of each transverse conveyer floor plate 36. As will be apparent from FIGS. 9 and 10, the cutting floor 48 slopes toward the adjacent edge of the conveyer floor plate 36, and thus slopes away from the middle portions of the conveyer floor plate 36. A supplementary wedge shaped cutting floor 56 is secured adjacent the higher edge of the sloping fish cutting floor 48, and along the opposite longitudinal edge of the cutting floor 48 there is a fish positioning fence 58 adjustably secured thereto as by stud screws 60. The angle of the cutting floor 48, the supplementary cutting floor 56 and the positioning fence 58 serve for the purpose of properly positioning the fish 62 in proper transverse position for being held and cut. The head 64 of the fish 62 abuts against a head positioning abutment 66.

The fish 62 drops into each unit 46 from a chute 65 located at opposite sides of the machine 10. As the conveyer floor first commences its travel, the fish feed down by gravity through the chute 65 having been placed therein in the proper position, either by hand or by any suitable mechanism (not shown). As the fish feed down the chute 65, it abuts a gate 68 where the fish is held until the gate 68 is opened by a connecting link 70 pivoted thereto and to a crank arm trigger 72 having a trigger end 74 which when abutted by cam 144 on the moving unit 46 opens the gate 68 long enough to let one fish feed therethrough and then closes. The fish 62 feeding therethrough drops down onto the unit 46 which is then in exact proper position to receive the fish and falls on fish cutting floor 48 against the fish positioning fence 58 and fish head abutment 66 being guided thereagainst not only by gravity on the sloping floor 48 and angular supplementary cutting floor 56 but also by a guide bar 76 fixedly secured as by an arm 78 depending from the end of the chute 65.

The fish cutting unit 46 is provided with a suitably shaped cutting knife 80 for cutting off the fish head 64 and also a belly strip 82 in a single cutting operation as illustrated in FIG. 12 and also with a second adjustably positioned knife 84 for simultaneously cutting off the fish tail 86. The fish body knife 80 and fish tail knife 84 are both mounted on the cutting unit roof 88. The roof 88 is suitably supported on a pair of coil springs 90 biased between the roof 88 and the floor 48 and surrounding guide bolts 92. This guides the roof 88 in a downward direction when it is depressed by the action of a cam shoe 94 thereon abutting and being depressed by and thereafter released by a series of cam rollers 96 suitably supported by and located on the framework as by adjacent transverse bars 196 extending between the side plates 14 in any suitable manner.

As each unit 46 passes under the cam rollers 96, the roof 88 will be depressed thereby and thus cause the knife 80 and the tail cutting knife 84 will come down in a cutting action and then when the cutting action is complete to be raised again by means of the springs 90.

However, before the cutting operation takes place, the fish is fixedly gripped by a number of upper and lower gripping prongs 98 and 100. The pair of upper prongs 98 are secured to and depend from an end of an angle upper gripper member 102 secured as by nuts 104 in properly adjusted position on the lower end of a bolt 106 which is slidably secured through the roof 88 and biased upwardly through the roof by a coil spring 108 biased between the top of the roof 88 around an apertured boss 110 and against a washer 112 which in turn biases against the bolt head 114. To assist in guiding the angle upper gripper members properly, a guide pin 116 extends through a suitable guide aperture 118 in roof 88.

A channel shaped cam 120 suitably mounted on the framework of the machine extends along the conveyor from the position just beyond which the fish has dropped into the unit 46 and been properly positioned therein by the fish guide bar 76 through its end at 122 where it releases the fish from the cutting unit 46.

As will be seen in FIG. 2, the gripper channel cam 120 has an angular portion 124 whose end is supported on a framework transverse bar 196 so as to gradually depress the angle upper gripper member 102 downwardly into gripping position.

As will be seen in FIGS. 9 and 10, the lower gripping prongs 100 which extend through apertures 126, are mounted on the ends of levers 128 pivoted at 130 to an ear 132 depending from the bottom of the angularly supported cutting floor 48. The outer end of the prong lever 128 extends beneath the lower end 134 of the upper gripper angle member 102, and this outer end of the lever 128 is secured by a tension coil spring 136 to an ear 138 on the side of the angle 102. As will be apparent from FIGS. 9 and 10, as the unit 46 travels along, the bolt head 114 traveling under the angular portion 124 of the cam channel 120 pushes the angle member 102 downwardly against the tension of coil spring 108 and forces the prongs 98 into the top of fish 62 and then as the lower edge 134 abuts the end of lever 128 it pushes prong 100 thereby securely gripping the fish for as long as the bolt head 114 is held down by the channel cam 120.

As will be noted from observing FIG. 2, the angled portion 124 of channel cam 120 operates to completely actuate the gripper prongs 98 and 100 into fish holding position before the cam shoe 94 of unit roof 88 is actuated by the cam rollers 96 to actuate the cutting knives. Obviously, the strength of the coil springs 90 will be substantially greater than the strength of the coil springs 108 so that it may raise the roof 88 and knife 80 and hold it up against the resistance of the coil springs 108.

As seen in FIGS. 6 and 8, the fish tail knife 84 is adjustably secured as by a stud bolt 140 extending into roof 88 through an adjusting slot 142 in the fish tail knife 84. Also seen in these two figures is the fish chute gate trigger operating cam 144 secured by a stud bolt 146 to the roof 88 so that as the unit 46 passes the chute 65 the cam 144 lifts the trigger end 74 long enough to let a single fish pass therethrough and drop onto the unit cutting floor 48 in proper position against the head abutment 66.

The fish head positioning abutment 66 serves to properly position the fish 62 when it drops onto the unit, but it is a part of a fish debris removing mechanism shown generally at 148 in FIGS. 3 to 6. This fish head positioning abutment 66 which is curved to conform to the general shape of the fish head 64 as seen in FIG. 3 is fixedly mounted on the end of an arm 150 whose other end is pivotally secured at 152 on a lever 154 which is slotted at 156 through which slot extends a securing pivot pin 158 secured in a support angle 160 fixedly mounted on an arm 162 extending upwardly from a bar 164 guided in a channel 166, the channel 166 being secured to the edge of cutting floor 48.

A coil spring 168 about the arm 150 is biased between a washer 170 against the end of lever 154 at one end and at its other end against an angle member 172 through which it extends to the fish head abutment 66, the channel 166 being suitably slotted to permit the arm 150 to reciprocate therethrough. The angle member 172 is fixedly supported on the end of a supporting bolt 174 whose other end is secured by adjusting nuts 176 to a supporting finger 178 fixedly secured to the support angle 160 and the support arm 162. As seen in FIG. 5, as well as in FIG. 3 and 6, the channel 166 through which bar 164 reciprocates is fixedly mounted on an edge of the cutting floor 48 in any suitable manner.

Journaled on the end of bar 164 is a roller 178 which cooperates with a cam track 180 secured to the framework side plate 14 in appropriate position. This cam track 180 has a bevel approach end 182 adjacent the entrance end of the conveyer and terminates in a more sharply angled cam portion 186. As the roller 178 passes over the bevel approach end 182 to the main portion 180, it cams inwardly the bar 164 through channel 166 and thus moves the fish head abutment 66 to the proper fish head abutting position coordinating it with the end of the fish positioning fence 58. As it does so, it partially compresses a coil spring 181 biased between a washer 183 against a pin 184 in the roller end of bar 164 and against the end of the channel 166. This brings the lever 154 to a position where an upstanding end flange 187 is substantially in contact with an upstanding leg 188 of an angle arm 190 secured in fixed relation to the end of channel 166 in a suitable manner to the bottom of the edge of cutting floor 48.

An L-shaped finger 192 cooperates with an upstanding pin 194 on the inner end of bar 164 to hold the bar 164 in position against the bias of spring 181 when roller 178 is not in contact with the cam track 180. While in this position, fish gripping prongs 98 and 100 are operated into fish holding position, then the fish body knife 80 and fish tail knife 84 are activated by the channel cam 120 to cut the fish in the position shown in FIG. 12.

As soon as the knives have been fully depressed cutting through the fish, the roller 178 abuts the sharply angled cam portion 186, pushing the cam bar 164 inwardly rotating lever 154 through its slot 156 on its pivot 158 to move the fish head abutment 66 very abruptly and thus knock the fish head 64, its attached belly strip 82, and its tail 86 off the cutting floor 48 onto the conveyer floor into the path of the complementary apertures 42 and 44. Just beyond this position, in the path of the apertures 42 and 44 there is positioned a wiper 195 depending from a framework transverse bar 196 which serves to wipe the fish debris into the complementary apertures 42 and 44 through which the debris falls onto a discharge chute 198 appropriately positioned between the upper and lower flights of the conveyer floor.

Extending from this same transverse bar 196 is a supporting finger 200 on which is pivotally mounted a lever 204 on one end of which is secured a rubber spoon 202. The other end of the lever 204 is in the path of an upright 206 suitably mounted on the conveyer floor as shown in FIG. 1. As will be seen in FIG. 1, the rubber spoon lever 204 is mounted beyond the end of the roller track 96 so that by time the unit 46 reaches the position of the rubber spoon 202, the unit roof 88 has been permitted to rise and withdraw the knives from about the cut portion of the fish 64 which, however, is still held by the gripper prongs 98 and 100. As the unit 46 moves along, the rubber spoon 202 enters the now cut open belly of the fish 62 and is pivoted by abutment 206 to knock the roe out of the belly of the fish onto the conveyer floor to about the middle of the conveyer where it passes to the end and drops into a suitable receptacle 208. After the spoon lever actuating abutment 206 has passed beyond the end of lever 204, the spoon rubber lever 204 is restored to its position by a coil spring 210.

Extending from the transverse 196 over the middle of the conveyer to another framework transverse 212 is a supporting bar 214. The bar 214 and the transverses 196 and 212 form in fact an H-member. Extending from the transverse bar 214 next in the path of the unit 46 on each side of the bar 214 is a brush handle 216 provided at its end with a wire brush 218 which enters the slit belly of the fish 62 and serves to brush out the blood from the fish 62 and at the same time weaken the tissue about the backbone of the fish.

As the unit moves along, it next encounters a pair of angularly converging knives 220 extending from the support bar 214, the knives 220 converging somewhat toward each other as illustrated in FIG. 11, so that they cut out and remove the backbone from the fish and drop it on the conveyer floor, along with the blood that has been previously dropped thereon by the brush 218. Beyond the knives 220, the unit reaches and passes beyond the end 122 of the channel cam 120 which in cooperation with the bolt heads 114 is holding the prongs 98 and 100 in gripping position. The springs 108 and the cooperating tension spring 136 then immediately withdraw the prongs from the cut fish portion 62, thus leaving the cut fish portion 62 unsecured on the holder 46, and the unit 46 next passes a fish removing finger 222 extending from the supporting bar 214. Then this finger 222, being in the path of the unsecured fish portion 62, removes the fish 62 from the unit 46 and drops it on the conveyer floor adjacent the unit 46 on the side thereof adjacent the outer edge of the conveyer floor. Then as the conveyer moves on, the cut portions of the fish 62 now cleaned of its backbone and blood and roe drops into a drag chute 224 for further processing and packaging. The blood and backbone which has been removed to a more inward position on the conveyer floor drops off the end of the conveyer into a suitably positioned receptacle 226 and the roe, as already described, at the middle of the conveyer floor, drops into the suitable receptacle 208. The conveyer floor plates 36 are secured to the sprocket chain 22 by means of U-brackets 228 as shown in FIGS. 9 and 10.

In operation, the fish to be processed are placed in proper position in the chute 65 by hand or any other suitable means. The fish cutting and cleaning units 46 travel endlessly about the conveyer so long as the motor 34 is in operation. As each unit 46 passes under the chute 65, the fish gate trigger 72 is actuated by its end 74 being lifted by the cam 144 on the unit 46 momentarily opening the gate 68 long enough for one fish to drop through onto the unit where the fish head positioning abutment 66 has already been moved into proper position by the roller 178 having passed over the entrance to bevel end 182 to the cam track 180, and the fish is properly positioned against the fish positioning fence 58 by means of the guide bar 76.

As the unit moves along toward the end of the guide bar 76, the angular portion 124 of gripper channel cam 120 actuates the gripper prongs 98 and 100 into gripping contact with the fish holding it in position as it passes beyond the end of the guard rail 76. Then as the unit continues, the cam rollers 96 contacting the cam shoe 94 on the unit roof 88 push the cutting knives 80 and 84 into cutting operation through the fish into contact with the cutting floor forming the pattern illustrated in FIG. 12, leaving the head 64, the belly strip 82, and the tail 86 as one integral piece of debris and as soon as the cutting operation is completed, the knives are released to move upwardly away from the cutting position.

Then, as the knives are moving upwardly, the roller 178 moving along cam track 180 hits the sharply angled end 186 to actuate the abutment 66 abruptly transversely of the unit and knock the fish debris consisting of the head, the attached belly strip and tail off the unit and then at the end 186 of the cam track 180, fish head abutment 66 is retracted to its maximum position, and with the knives 80 and 84 raised, the cut portion of the fish 62 is still held on the unit 46 but now with the belly slit open. Next, the unit 46 reaches the position of the rubber spoon 202 which is actuated by the actuating abutment 206 hitting the end of the spoon handle 204, depositing the roe along the midline of the conveyer floor. As the unit continues, the brush 218 then enters the fish belly brushing out the blood and weakening the tissue about the backbone. Next, the pair of converging knife edges 220 enter the fish, cut out the backbone and drop it on the conveyer and finally the unit passes the end 122 of the channel cam releasing the gripping prongs 98 and 100 from the fish 62 and finger 222 then pushes the fish onto the conveyer floor.

As the unit then passes around the end of the conveyer means, the roe drops off in the receptacle 208 at the middle, the fish blood and backbone drop off in a receptacle 226 on either side of the middle and the processed fish portions drop off in the fish drag 224, fish debris consisting of the head, belly and tail having been wiped from the conveyer floor by the wiper through the apertures onto the debris chutes 196.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fish cutting and cleaning machine comprising an endless conveyer means which carries fish through cutting and cleaning operations, means for moving said endless conveyer means in a continuous endless path, said conveyer means having a horizontal upper flight, a plurality of fish holding and cutting units secured to said conveyer means in spaced apart relation, means actuated by each unit as said unit passes thereby at the beginning of said horizontal flight for feeding a fish to each passing unit at the commencement of each operation, longitudinally extending cam means in the path of said units for actuating each unit to securely hold the fish fed thereto, a second longitudinally extending cam means, shorter than said first cam means, and ending before said first cam means, for subsequently actuating said unit to simultaneously cut the head, tail and belly edge tissue therebetween from the held fish, means located beyond the end of said second cam means for removing the cut debris from the said unit to said conveyer means, means for sequentially cleaning the fish while still held in the unit, spring means for actuating said unit, when said unit has moved beyond said first cam means, to release the fish held therein, and means for sequentially removing the released fish from said unit.

2. The machine of claim 1, said fish cleaning means including means entering the cut fish held in said unit to remove the fish roe and deposit it on said conveyer means, brush means entering the cut fish held in said unit to remove fish blood and weaken the backbone tissue, and knife means entering the cut fish held in the unit to remove the backbone therefrom to said conveyer means.

3. The machine of claim 2, said fish roe removing means comprising a fixed frame element, a finger yieldably pivoted to said fixed frame element, one end of said finger extending into the path of the fish roe in the cut fish on its unit, an upstanding abutment on said conveyer means adjacent said unit, the other end of said finger being in the path of said upstanding abutment, said abutment actuating said finger to eject the fish roe to said conveyer means as said abutment abuts the finger end.

4. The machine of claim 2, said knife means comprising a pair of spaced apart knife elements converging toward each other.

5. The machine of claim 1, said conveyer means having a debris discharge opening adjacent each unit, a debris discharge chute extending under the path of said discharge openings, and wiper means causing the fish debris to pass through the adjacent discharge opening to drop into said debris chute.

6. The machine of claim 5, said endless conveyer means comprising a plurality of transversely extending plates supported adjacent on endless sprocket chain means and sprocket means, said plates having oblique angled adjacent sides.

7. The machine of claim 6, one transverse plate providing securing means for at least one fish holding and cutting unit, the adjacent plate following said unit securing plate having said debris discharge opening therethrough.

8. The machine of claim 7, and said adjacent plate preceding said unit securing plate also having said debris discharge opening therethrough, said discharge opening of said following plate complementing said discharge opening of the next following plate, said next following plate preceding the next following unit securing plate.

9. The machine of claim 1, said fish holding and cutting unit including a fish supporting floor, a pair of cooperating fish gripping prong means, a pivoted lever supporting one prong means at one end thereof to ascend up through said floor, means yieldably supporting an L-bar for vertical movement above said floor ascending prong means with said other gripping prong means secured on one leg of said L-bar in opposed relation to said floor ascending prong means, the other leg of said L-bar abutting the other end of said pivoted lever to cooperatively actuate both said prong means, said fish holding unit actuating means comprising cam track means depressing and releasing said L-bar supporting means as said unit travels on said conveyer, yieldable means linking said other end of said pivoted lever and said lever end L-bar abutting leg retracting said gripping prong means from gripping position.

10. The machine of claim 9, a roof yieldably supported on said fish supporting floor thereabove for vertical movement in relation thereto, said L-bar being supported by said roof, fish cutting knife means secured to said yieldably supported roof, said means for actuating said unit to cut the fish comprising a roller cam track cooperating with said roof to depress roof and knife and permit said roof and knife to retract in relation to the fish held therein, said gripping prong means actuating cam track commencing before and extending beyond said knife means actuating roller cam track.

11. The machine of claim 10, said fish cutting knife means comprising a transversely extending fish head cutting portion and a curved somewhat longitudinally extending belly edge cutting portion and separate transversely extending adjustably secured fish tail cutting means.

12. The machine of claim 1, said fish holding and cutting unit including a fish supporting floor, a fish positioning fence extending longitudinally adjacent one side of said floor, an incline element adjacent the other side of said floor urging the fish thereon towards said fence, and a fish head receiving means at the front end of said floor.

13. The machine of claim 12, said fish head receiving means comprising a fish head receiving element abutting a side of the fish head, transversely movable carriage means on which said fish head receiving element is mounted, cooperating cam means on said carriage means, and stationary cam means transversely actuating said cooperating cam means on said carriage means to project the cut fish head from said unit after said cutting means has been actuated.

14. The machine of claim 12, said fish feeding means comprising an inclined chute supported on the machine at beginning of said horizontal flight, a gate in said chute, and a gate opening trigger momentarily cooperating with a cam on a passing unit to open said gate and feed a fish to said passing unit.

15. The machine of claim 14, and a fish guide rail secured to and extending from said fish chute, parallel to and spaced transversely from the path of said fence guiding the fish into position on said unit floor against said fish fence.

16. The machine of claim 1, said fish removing means comprising a fish removing finger fixed in the path of the released fish on said unit.

References Cited in the file of this patent

UNITED STATES PATENTS 2,142,420     Sullivan                Jan. 3, 1939